US011793229B2

(12) United States Patent
Sugita et al.

(10) Patent No.: US 11,793,229 B2
(45) Date of Patent: Oct. 24, 2023

(54) DEVICE AND METHOD FOR PRODUCING FOAMED FOOD PRODUCT

(71) Applicant: Toho Acetylene Co., Ltd., Tagajo (JP)

(72) Inventors: Noriko Sugita, Tagajo (JP); Naotada Sakai, Tagajo (JP); Yuichi Sasaki, Tagajo (JP); Naoki Oikawa, Tagajo (JP)

(73) Assignee: Toho Acetylene Co., Ltd., Tagajo (JP)

( * ) Notice: Subject to any disclaimer, the term of this patent is extended or adjusted under 35 U.S.C. 154(b) by 29 days.

(21) Appl. No.: 17/589,254

(22) Filed: Jan. 31, 2022

(65) Prior Publication Data

US 2022/0330603 A1 Oct. 20, 2022

(30) Foreign Application Priority Data

Apr. 16, 2021 (JP) ................. 2021-069554

(51) Int. Cl.
*A23P 30/40* (2016.01)
*A23C 13/12* (2006.01)
*A47J 43/12* (2006.01)

(52) U.S. Cl.
CPC .............. *A23P 30/40* (2016.08); *A23C 13/12* (2013.01); *A47J 43/125* (2013.01); *A47J 43/127* (2013.01); *A47J 43/128* (2013.01)

(58) Field of Classification Search
CPC ..... A23P 30/40; A23C 13/12; A23C 2210/30; A23C 2270/10; A47J 43/125; A47J 43/127; A47J 43/128; A47J 43/046; A47J 43/0465
See application file for complete search history.

(56) References Cited

U.S. PATENT DOCUMENTS

| 4,526,730 A * | 7/1985 | Cochran | B01F 23/23611 |
| | | | 426/477 |
| 5,329,975 A * | 7/1994 | Heitel | B65D 83/42 |
| | | | 261/DIG. 7 |

(Continued)

FOREIGN PATENT DOCUMENTS

| JP | 2006-345776 A | 12/2006 |
| JP | 2007-028939 A | 2/2007 |
| WO | WO 2008/149848 A1 | 12/2008 |

*Primary Examiner* — Vishal Pancholi
(74) *Attorney, Agent, or Firm* — ArentFox Schiff LLP

(57) ABSTRACT

A device for producing a foamed-food-product comprises a container which stores a liquid-food-product and is filled with filling gas at a pressure higher than atmospheric pressure, the filling gas containing argon or nitrogen as a main component; an agitator provided at the bottom of the inside of the container; a driving unit detachably connected to the bottom of the container to rotate the agitator, agitate the liquid-food-product in the container by the rotation of the agitator, and mix the filling gas in the liquid-food-product; and a dispenser mounted to the container and having a discharge outlet and a gas filling inlet for injecting the filling gas into the container, the dispenser causing the liquid-food-product having the filling gas mixed therein to be discharged from the discharge outlet by pressure in the container, so that the liquid-food-product foams while being discharged from the discharge outlet and is made into the foamed-food-product.

7 Claims, 10 Drawing Sheets

(56) References Cited

U.S. PATENT DOCUMENTS

| | | | |
|---|---|---|---|
| 7,100,799 B2* | 9/2006 | Gruenewald | A47J 43/121 |
| | | | 222/399 |
| 9,227,827 B1* | 1/2016 | Scott | B67D 1/0418 |
| 10,473,269 B2* | 11/2019 | Gisin | F17C 7/00 |
| 2010/0221392 A1 | 9/2010 | Nakai et al. | |
| 2011/0049193 A1* | 3/2011 | Muller Kubold | B67D 1/0412 |
| | | | 222/399 |
| 2015/0245635 A1* | 9/2015 | Smith | A23G 9/46 |
| | | | 426/519 |
| 2019/0357587 A1* | 11/2019 | Taylor | A23G 9/46 |

* cited by examiner

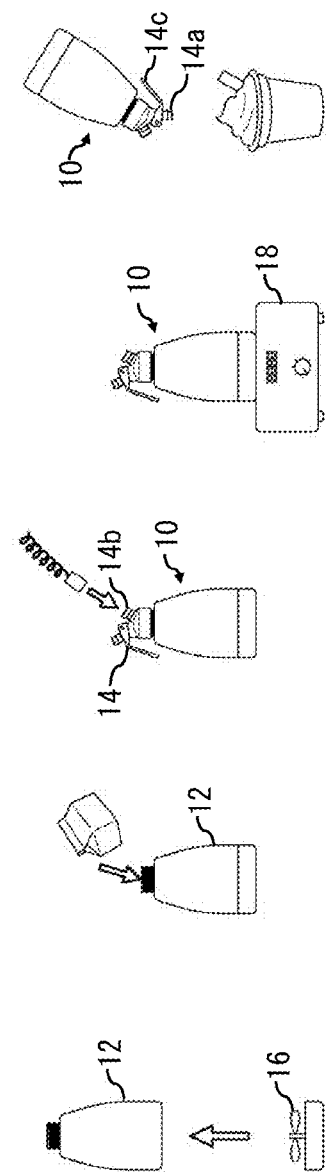

FIG. 7

ARGON GAS (100% ARGON)

FL:Fluidity, FM:Foamability

| Filling Pressure | AGITATION TIME ||||||||||
|---|---|---|---|---|---|---|---|---|---|---|
| | 1min | 2min | 3min | 4min | 5min | 6min | 7min | 8min | 9min | 10min |
| 0.9MPa | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ | FL:× |
| 0.8MPa | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ |
| 0.7MPa | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ |
| 0.5MPa | FL:○ FM:× | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ |

FIG. 8

NITROGEN GAS (100% NITROGEN)

FL:Fluidity, FM:Foamability

| Pressure | 1min | 2min | 3min | 4min | 5min | 6min | 7min | 8min | 9min | 10min | 11min | 12min | 13min | 14min | 15min | 16min | 17min | 18min | 19min | 20min |
|---|---|---|---|---|---|---|---|---|---|---|---|---|---|---|---|---|---|---|---|---|
| 0.9MPa | FL:○ FM:× | FL:○ FM:× | FL:○ FM:× | FL:○ FM:× | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:× |
| 0.8MPa | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:× |
| 0.7MPa | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ |
| 0.5MPa | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:× | FL:○ FM:○ | FL:○ FM:○ | FL:○ FM:○ | FL:○ FM:○ | FL:○ FM:○ | FL:○ FM:○ | FL:○ FM:○ | FL:○ FM:○ | FL:○ FM:○ |

TIME

DEVICE AND METHOD FOR PRODUCING FOAMED FOOD PRODUCT

CROSS-REFERENCE TO RELATED APPLICATION

This application is based upon and claims the benefit of priority of the prior Japanese Patent Application No. 2021-69554, filed on Apr. 16, 2021, the entire contents of which are incorporated herein by reference.

FIELD

The present invention relates to a device and method for producing a foamed food product such as whipped cream using foaming gas such as argon gas and nitrogen gas having a relatively low degree of solubility in a liquid food product.

BACKGROUND

A conventional device for producing a foamed food product such as whipped cream, a so-called espuma has a container (bottle) and a dispenser mounted to the container (see for example Japanese Patent Application Publication Nos. 2006-345776 and 2007-028939 and WO 2008/149848). When a liquid food product (such as fresh cream) stored in a pressurized state in the container is discharged from the outlet of the dispenser, the gas dissolved in the liquid food product expands and foams due to decompression and a foamed food product (such as whipped cream) is produced.

FIGS. 11A to 11D are views for illustrating a conventional method for making whipped cream using the espuma, which is the device producing a foamed food product. As shown in FIGS. 11A to 11D, a material for whipped cream such as fresh cream is introduced into the container 2 of the espuma 1 (FIG. 11A), a dispenser 4 is mounted to the container 2, and the container 2 is filled with nitrous oxide gas at a pressure higher than atmospheric pressure (for example, about 0.8 MPa) and sealed (FIG. 11B). Then, the espuma 1 is manually shaken multiple times to dissolve the nitrous oxide gas in the fresh cream (FIG. 11C), then the fresh cream is discharged and sprayed from the outlet of the dispenser 4 by the gas pressure inside the container 2, and as the pressure is returned to atmospheric pressure at the outlet, the nitrous oxide gas dissolved in the fresh cream expands and foamed whipped cream is produced (FIG. 11D).

Note that according to a common foaming method (whipped cream producing method), fresh cream is made by agitating fresh cream, breaking down fat globules as a component thereof, and gas bubbles are trapped between the broken fat globules by the adhesiveness between the broken fat globules, while as described above, according to the method with the espuma, gas dissolved in liquid fresh cream is foamed as the pressure of the gas is reduced, that is different from the common foaming method.

SUMMARY

The nitrous oxide ($N_2O$) gas filled in the espuma has a relatively high degree of solubility among the gases approved as food additives (solubility in water: 130.5 cc/100 cc of $H_2O$ (at atmospheric pressure and 0° C.)), and the operation of shaking the espuma multiple times allows the nitrous oxide gas to be easily dissolved in the fresh cream, and therefore whipped cream can be made efficiently in a short period of time.

Meanwhile, nitrous oxide gas is known as a greenhouse effect gas having a global warming potential (GWP) as high as 298, and from the viewpoint of recent global warming countermeasures, there has been a demand for a foamed food product producing method without using nitrous oxide gas. Under the circumstances, among the gases approved as food additives, argon (Ar) gas or nitrogen ($N_2$) gas with zero global warming potential has been attracting attention as an alternative to nitrous oxide gas. Ar gas has a solubility in water of 5.6 cc/100 cc of $H_2O$ (at atmospheric pressure and 0° C.), and nitrogen gas has a solubility in water of 2.35 cc/100 cc of $H_2O$ (at atmospheric pressure and 0° C.).

However, although argon or nitrogen gas is not a greenhouse gas, either gas has a significantly lower degree of solubility than that of nitrous oxide gas, and therefore sufficiently foamed whipped cream cannot be made by manually shaking the espuma unlike the conventional method.

The present invention is directed to a solution to the problem, and it is an object of the present invention to provide a device and method for producing a foamed food product by discharging a liquid food product such as fresh cream stored in a container using argon gas or nitrogen gas instead of nitrous oxide gas.

In order to achieve the above object, a device for producing a foamed food product according to the present invention includes a container which stores a liquid food product and is filled with filling gas at a pressure higher than atmospheric pressure, the filling gas containing argon (argon gas) or nitrogen (nitrogen gas) as a main component, an agitator provided at the bottom of the inside of the container, a driving unit detachably connected to the bottom of the container to rotate the agitator, agitate the liquid food product in the container by the rotation of the agitator, and mix the filling gas in the liquid food product, and a dispenser mounted to the container and having a discharge outlet and a gas filling inlet for injecting the filling gas into the container, the dispenser causes the liquid food product having the filling gas mixed therein to be discharged from the discharge outlet by pressure in the container, so that the liquid food product foams while being discharged from the discharge outlet and is made into the foamed food product.

A method for producing a foamed food product according to the present invention uses the device described above and includes the steps of introducing the liquid food product into the container, mounting the dispenser to the container, filling the container with the filling gas injected from the gas filling inlet of the dispenser, connecting the bottom of the container with the driving unit and rotating the agitator, thereby agitating the liquid food product in the container, and causing the liquid food product to be discharged from the discharge outlet of the dispenser and foam while being discharged from the discharge outlet, thereby producing the foamed food product.

With the device and method for producing a foamed food product according to the present invention, the liquid food product stored in the container can be discharged and made into a foamed food product using argon gas or nitrogen gas. In particular, even using argon gas or nitrogen gas instead of nitrous oxide gas in the conventional case, fresh cream is agitated by the agitator provided in the container and therefore whip cream can be produced efficiently in a short period of time.

BRIEF DESCRIPTION OF DRAWINGS

FIGS. 5A to 5E are schematic views for illustrating a foamed food product producing method using the foamed food product producing device according to the embodiment;

FIG. 7 is a table of results of whipped cream producing experiments with argon gas;

FIG. 8 is a table of results of whipped cream producing experiments with nitrogen gas;

DESCRIPTION OF EMBODIMENTS

An embodiment of the present invention will be described with reference to the drawings. Meanwhile, the technical scope of the present invention is not limited by the embodiment.

Figure 1:
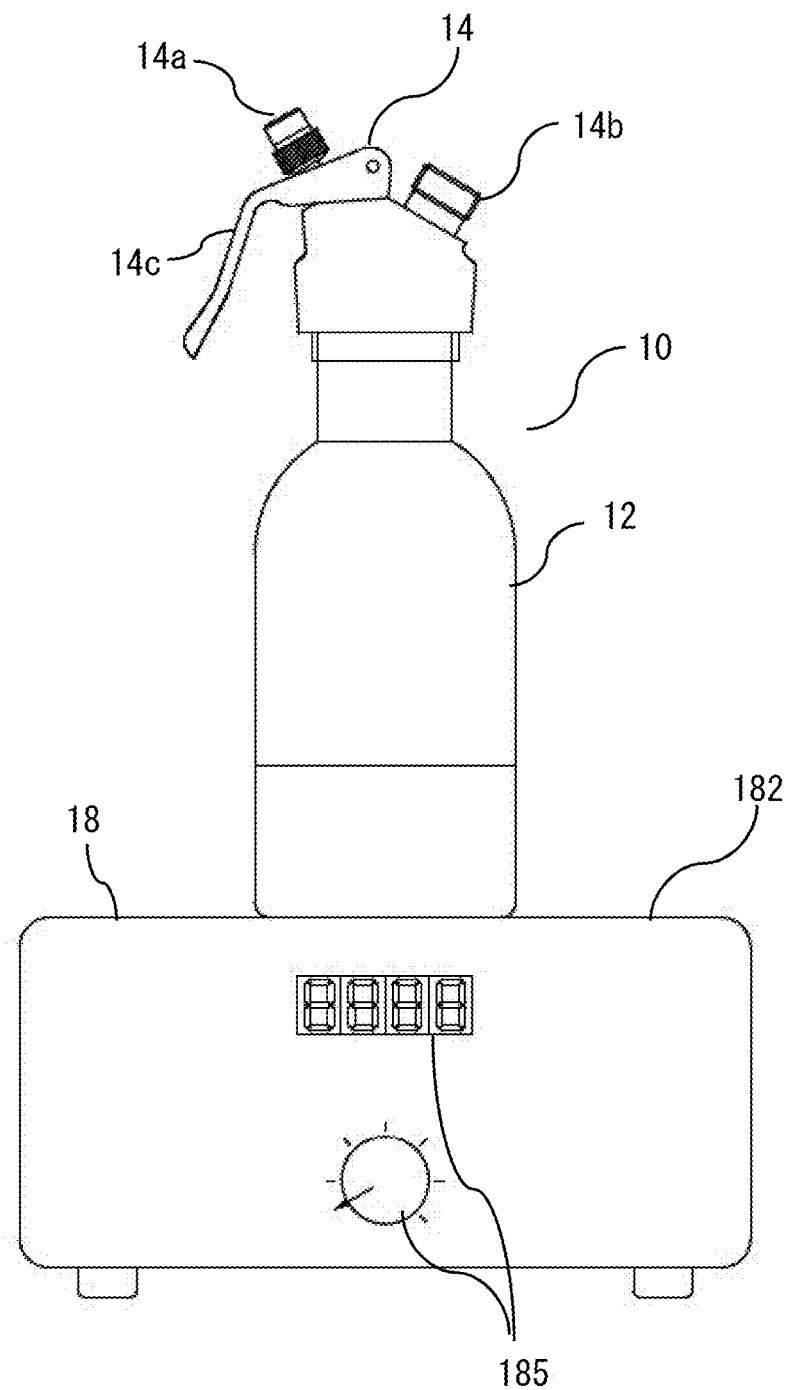
FIG. 1 is a view of an exemplary general structure of a foamed food product producing device according to an embodiment of the present invention.
Figure 2:
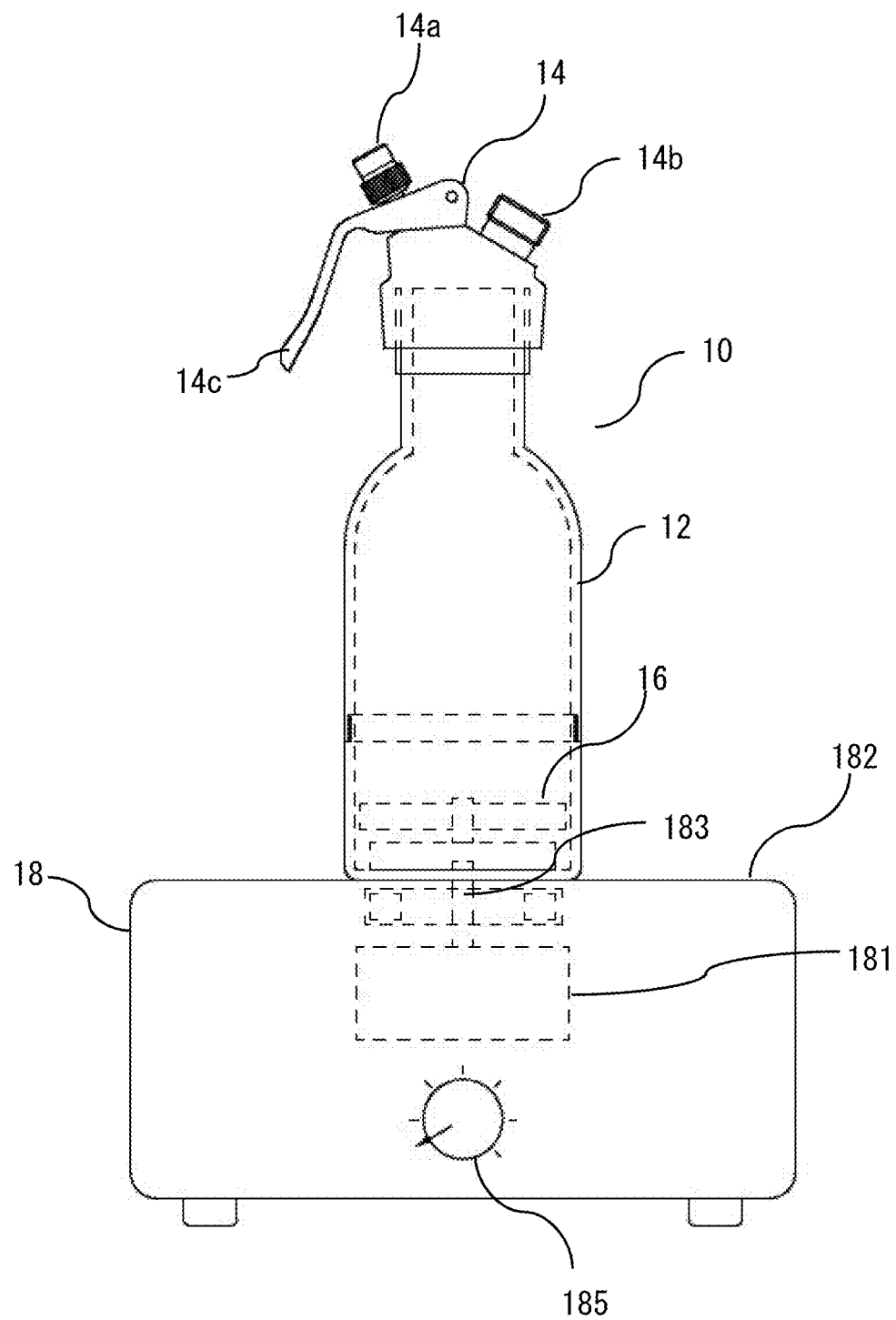
FIG. 2 is a sectional view of the internal structure of the foamed food product producing device according to the embodiment.

FIG. 1 is a view of an exemplary general structure of a foamed food product producing device according to an embodiment of the present invention. FIG. 2 is a sectional view of the internal structure of the foamed food product producing device according to the embodiment. The foamed food product producing device 10 according to the embodiment includes a container 12 which stores a liquid food product and injected with gas having argon or nitrogen as a main component at a higher pressure than atmospheric pressure, a dispenser 14 mounted at the top opening of the container 12, an agitator 16 provided at the bottom of the inside of the container 12, and a driving unit 18 connected with the bottom of the container 12 by detachably coupling or contacting to rotate the agitator 16. The foamed food product producing device 10 according to the embodiment is an espuma which expands gas mixed in a liquid food product and foams the food product by decompression caused by discharge of the liquid food product from the dispenser 14.

The gas having argon as its main component may be gas only of argon (100% argon) or a mixture gas containing argon and less than 10% by volume of (more preferably less than 5% by volume of) another kind of component gas (such as air or another kind of gas approved as a food additive), and these will be collectively referred to as argon gas. Similarly, the gas having nitrogen as its main component may be gas only of nitrogen (100% nitrogen) or a mixture gas containing nitrogen and less than 10% by volume of (more preferably less than 5% by volume of) another kind of component gas (such as air or another kind of gas approved as a food additive). These will be collectively referred to as nitrogen gas.

The container 12 may store a liquid food product such as fresh cream. The container 12 may be a pressure-resistant bottle made of a metal such as stainless steel or resin and formed to have a cylindrical shape which can be divided into upper and lower parts. The upper and lower parts of the container 12 formed in the divisible manner may be screwed together, and the connected parts are kept watertight for example with a waterproof component such as an O-ring (not shown). The top of the container 12 is open upwardly, and the dispenser 14 may be detachably screwed to the container 12 in a watertight manner to cover the top of the container 12 and seal the inside of the container 12. Since the container 12 can be divided into the upper and lower parts, the agitator 16 (which will be described) provided at the bottom of the container 12 can be attached/detached to/from the inside of the container 12.

The dispenser 14 has a discharge outlet 14a and a gas filling inlet 14b. The discharge outlet 14a is an opening through which a liquid food product in the container 12 is discharged, and the outlet has a valve or lid structure that opens and closes by operation of the lever 14c, and in response to its opening operation, the liquid food product in the container 12 is discharged from the discharge outlet 14a due to pressure higher than atmospheric pressure in the container 12. A removable nozzle (not shown) may be attached to the discharge outlet 14a.

The gas filling inlet 14b is an opening for injecting argon gas or nitrogen gas from a gas cylinder (not shown) into the container 12 and has a valve or lid structure which opens when a gas supply pipe (not shown) extending from the gas cylinder is connected thereto, and in response to its opening operation, argon gas or nitrogen gas stored in the gas cylinder is injected and filled into the container 12 through the gas supply pipe from the gas filling inlet 14b. The gas pressure in the container 12 is set to about in the range from 0.3 MPa to 1 MPa which is higher than atmospheric pressure.

The agitator 16 can be a rotator and is rotatably provided at the bottom of the container 12. A bearing part which rotatably supports the agitator 16 is provided at the bottom of the container 12, and the agitator 16 can be rotated by a motor (which will be described) provided in the driving unit 18.

Figure 3A:
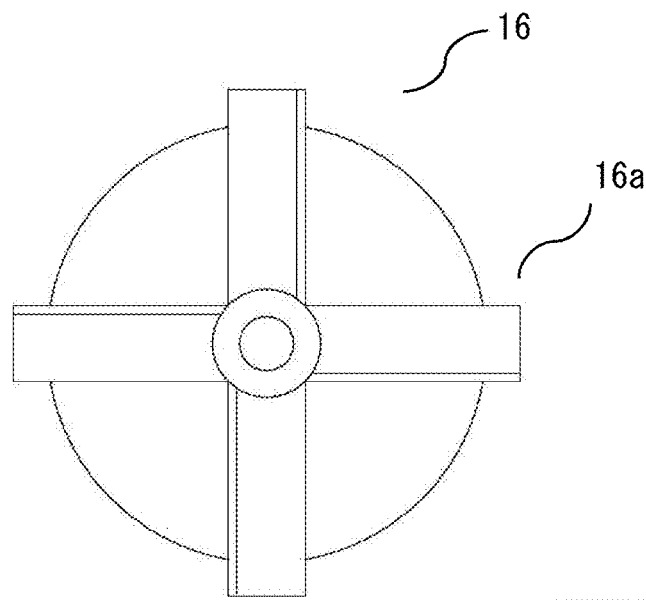
FIGS. 3A and 3B are views for illustrating an exemplary shape of an agitator 16.
Figure 3B:
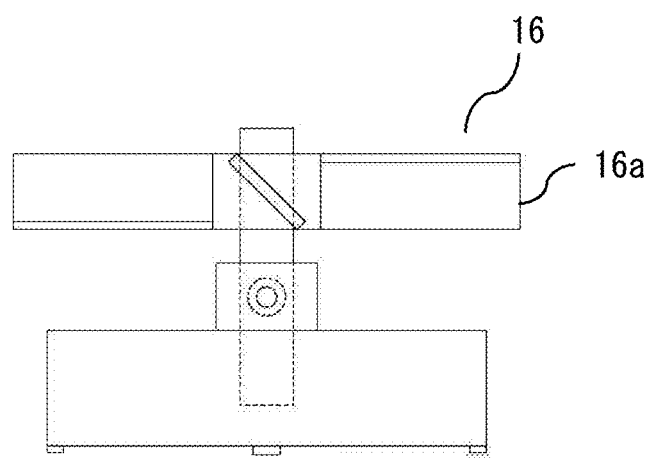

FIGS. 3A and 3B are views for illustrating an exemplary shape of the agitator 16. FIG. 3A is a plan view of the agitator 16, and FIG. 3B is a side view of the agitator 16. The agitator 16 has a rotating blades 16a and the four rotating blades 16a are arranged at intervals of 90° from the rotation center as shown in the figure. In order to increase the agitation effect, each of the rotating blades 16a may be shaped to have a bent part. The rotation of the agitator 16 agitates the liquid food product in the container 12, so that the liquid food product in the container 12 is mixed with argon gas or nitrogen gas.

Figure 4A:
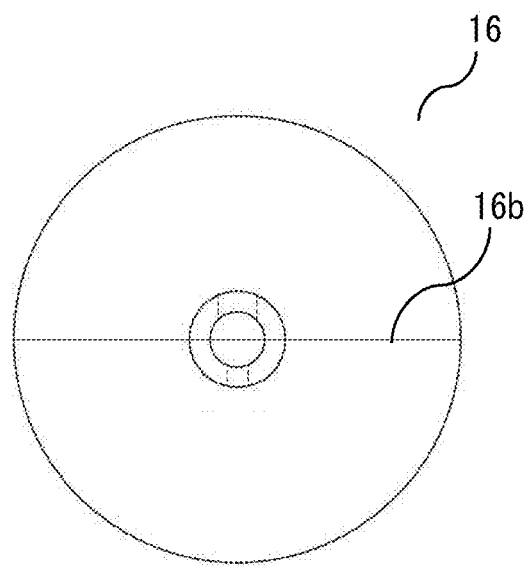
FIGS. 4A and 4B are views for illustrating another exemplary shape of the agitator 16.
Figure 4B:
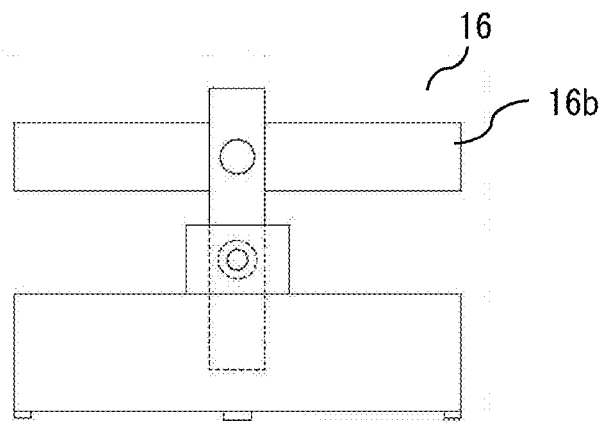

FIGS. 4A and 4B are views for illustrating another exemplary shape of the agitator 16. FIG. 4A is a plan view of the agitator 16, and FIG. 4B is a side view of the agitator 16. The agitator 16 has a rotating blade 16b similarly to the structure in FIGS. 3A and 3B, and as shown, two rotating blades 16b are arranged to extend in opposite directions from the center of rotation. The rotating blades 16b are formed in the shape of a flat plate without any bent part, and the shape allows the agitator 16 to be easily cleaned when the agitator is removed for cleaning, so that the maintenance performance may be improved.

The driving unit 18 has a driving source 181 which rotates the agitator 16 and a base stand 182 which is connected to the bottom of the container 12 to support the container 12. An operation panel 185 provided on the side of the base stand 182 includes a power switch, an operation unit (for example a button or a knob) for controlling the rotation speed of the driving source 181, and a display unit (for example an LCD panel). The driving source 181 of the driving unit 18 may be an electric motor, the rotation shaft 183 of the electric motor 181 is arranged to extend upwardly and protrude on the top surface of the base stand 182, the bearing part provided at the bottom of the container 12 and the rotation shaft 183 are fitted and mechanically connected with each other, and the container 12 having a known mechanical seal structure is provided on the base stand 182. The electric motor 181 rotates the agitator 16 mounted inside the container 12 provided on the base stand 182. The liquid food product in the container 12 is agitated by rotating the agitator 16, the argon gas or nitrogen gas filled in the container 12 is mixed with the liquid food product.

When fresh cream as a foamed food is produced by agitating fresh cream as a liquid food product using the device and the fresh cream is agitated by the rotation of the agitator 16, some of the fat globules dispersed in the fresh cream are destroyed. The fat flowing out of the destroyed fat globules serves to adhere the fat globules to one another, and the gas in the container 12 is trapped between the fat globules sticking together (surrounding the gas bubbles) in the process, so that the gas is held in the fresh cream, and a sufficient amount of the argon gas or nitrogen gas for foaming during discharge is mixed with the fresh cream.

In this way, the fresh cream mixed with the gas is discharged from the discharge outlet 14a of the dispenser 14 by the pressure inside the container 12, and the gas mixed with the fresh cream foams the cream as the cream is discharged from the discharge outlet 14a and whipped cream is produced as a result. When argon gas or nitrogen gas with a relatively low degree of solubility is used, the fresh cream and the argon gas or nitrogen gas in the container 12 are agitated by rotating the agitator 16, the cream and the argon gas or nitrogen gas can be mixed efficiently, and whipped cream can be produced using the argon gas or nitrogen gas.

When the agitation of the fresh cream in the container 12 exceeds a predetermined degree, most of the fat globules of the fresh cream may be destroyed and the fat globules may adhere to one another while trapping gas bubbles therebetween and the fresh cream may be made into whipped cream in the container similarly to a common foaming method. In this case, since the cream is not maintained in a liquid state in the container 12 and has an increased viscosity, the whipped cream cannot be easily discharged by spraying from the discharge outlet 14a, and when the container 12 is turned upside down for discharge operation, the whipped cream does not flow down in the container and is not discharged from the discharge outlet 14a. Therefore, in the agitating operation using the foamed food product producing device according to the present invention, the liquid substance in the container 12 is agitated to such an extent that the liquid substance is maintained in a liquid state, or specifically that the liquid substance in the container is fluid enough to flow down in the container when the container 12 is turned upside down.

The agitator 16 and the driving source 181 of and the driving unit 18 are not limited to a mechanical coupling mechanism such as the illustrated electric motor 181 and may also be configured to rotate the agitator 16 by magnetic means for example using a magnetic coupling mechanism such as a magnetic stirrer. In this case, the container 12 is provided on the base stand 182 of the driving unit 18, and the driving unit 18 is connected in contact with the bottom of the container 12.

FIGS. 5A to 5E are schematic views for illustrating a foamed food product producing method using the foamed food product producing device (espuma) 10 according to the embodiment described above, and FIG. 6 is a flowchart for illustrating the foamed food product producing method according to the embodiment corresponding to FIGS. 5A to 5E. As shown in FIG. 5A, according to the foamed food product producing method, the container 12 having the agitator 16 inside is prepared, and a liquid food product is introduced into the container 12 (FIG. 5B and S100 in FIG. 6).

Figure 6:
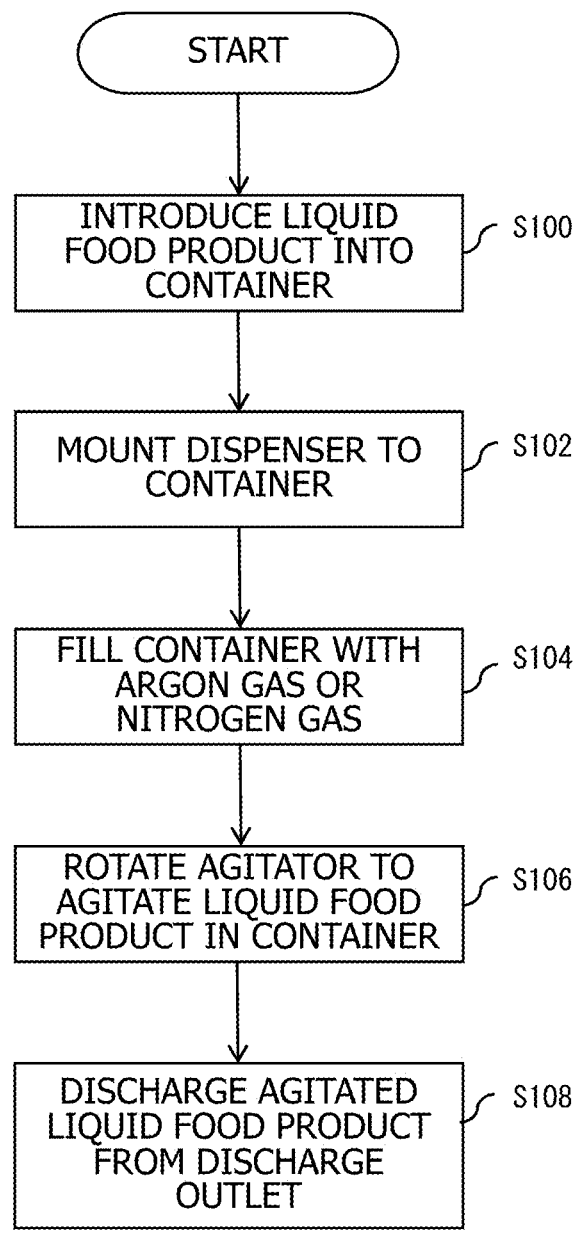
FIG. 6 is a flowchart for illustrating the foamed food product producing method according to the embodiment.

After introducing the liquid food product, the dispenser 14 is mounted to the container 12 (S102 in FIG. 6), a gas cylinder is connected to the dispenser, and the container 12 is filled with argon gas or nitrogen gas from the gas filling inlet 14b of the dispenser 14 (FIG. 5C and S104 in FIG. 6).

The bottom of the container 12 is connected to the driving unit 18 to rotate the agitator 16, so that the liquid food product in the container 12 is agitated (FIGS. 5D and S106 in FIG. 6).

The lever 14c of the dispenser 14 is operated to cause the agitated liquid food product to be discharged from the discharge outlet 14a, and the liquid food product foams while being discharged from the discharge outlet 14a due to decompression, so that a foamed food product is produced (FIG. 5E and S108 in FIG. 6).

After connecting the container 12 having the agitator 16 provided inside is connected to the driving unit 18, the processing for introducing the liquid food product into the container 12 or filling the container with argon gas or nitrogen gas from the gas filling inlet 14b may be carried out.

In the following description of the embodiment, whipped cream is produced by mixing argon gas into fresh cream according to the foamed food product producing method shown in FIGS. 5A to 5E and 6 using the foamed food product producing device shown in FIGS. 1, 2, 3A, 3B, 4A, and 4B.

Experiment Method

Whipped cream was produced under the following production conditions, and the state was observed and evaluated. Note that the container was made of a transparent resin material for the purpose of the experiment so that the state of the liquid food product inside the container could be observed, and the fluidity of the liquid food product was evaluated as will be described.

(a) Liquid Food Product
  250 ml of fresh cream
  Nonfat milk solids: 4.0%
  Milk fat: 13.0%
  Vegetable fat: 26.0%
  Ingredients: a dairy product, vegetable oil and fat, lactose, emulsifier, and stabilizer
(b) Gas Species
  Argon gas (100% argon)
  Nitrogen gas (100% nitrogen)
(c) Agitator (Agitator)
  Two blades shown in FIGS. 4A and 4B
  Rotation speed: 800 times/min
  Agitation time: 1 to 20 minutes
(d) Filling Pressure
  Experiments were conducted in the filling pressure range from 0.5 MPa to 0.9 MPa.

Experiment Result

FIG. 7 shows the result of the whipped cream producing experiment using argon gas as the gas species. FIG. 8 shows the result of the whipped cream producing experiment using nitrogen gas as the gas species.

FIGS. 7 and 8 show the result of evaluation of the fluidity (FL) of the cream inside the container and the foamability (FM) of the foamed food (whipped cream) discharged from the discharge outlet by spraying the liquid food product (fresh cream) in the container.

The fluidity (FL) was evaluated visually, and the foamability (FM) was evaluated visually and on the basis of the pressure under load of the foamed food (whipped cream).

Criterion for Evaluating Fluidity (FL)

When whipped cream is made using an espuma, the liquid food product (fresh cream) in the container is sprayed out from the discharge outlet, the dispenser lever is operated to discharge the food product from the outlet while the container is turned upside down, and therefore the liquid food product needs to be fluid enough to flow down to the discharge outlet in the container after the container is turned upside down.

When the fresh cream flew down smoothly in the container after the container was turned upside down, the state was determined "appropriate", and when the fresh cream partly flew down in the container but mostly remain firm and sticked to the bottom or the side or the fresh cream did not flow at all and stayed inside the container after the container was turned upside down, the state was determined "inappropriate". In the experiment result data shown in FIGS. 7 and 8, "o" is used to indicate "appropriate" fluidity (FL), and "x" is used to indicate "inappropriate" fluidity (FL). When the fluidity was "inappropriate", foaming operation could not be performed, and foamability (FM) evaluation was not carried out.

Criterion for Evaluating Foamability (FM)

Foamability (FM) is necessary in order to have gas mixed in the liquid food product expand due to decompression as the liquid food product is sprayed from the discharge outlet by the pressure in the container and to produce a sufficiently foamed food product (whipped cream).

When the foamed food product (whipped cream) was sufficiently frothy and foamed and had a load bearing pressure of 0.1 kPa or more, and the cream is discharged smoothly (with the gas being trapped inside), the state was determined "appropriate", and when the cream was barely foamed (having peaks) but the load bearing pressure was less than 0.1 kPa or the cream was not foamed at all and remained in a liquid state, or the cream solidified and only gas was discharged was determined "inappropriate". In the experiment result data shown in FIGS. 7 and 8, "o" indicates "appropriate" foamability (FM) and "x" indicates "inappropriate" foamability (FM).

Figure 9:
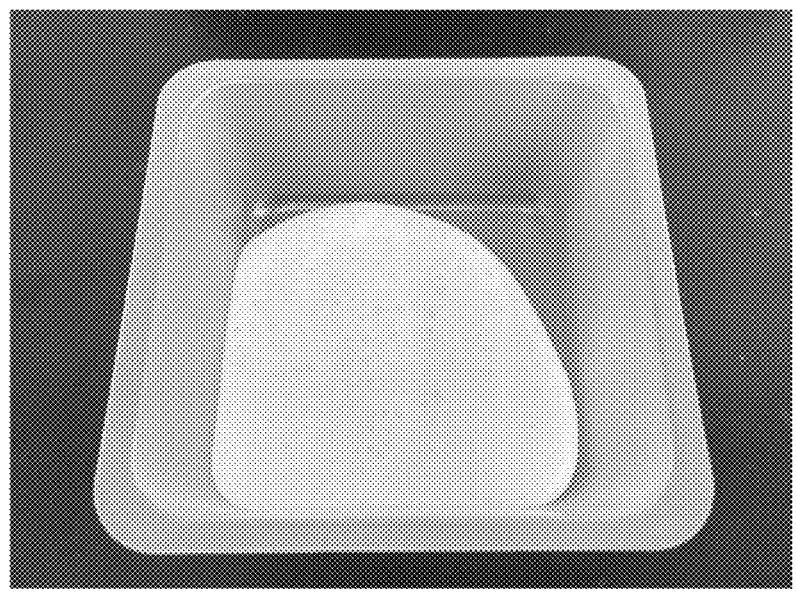
FIG. 9 is a photograph showing discharged fresh cream without foam.
Figure 10:
FIG. 10 is a photograph showing an example of whipped cream made from discharged fresh cream in a sufficiently foamed state.
Figure 11D:
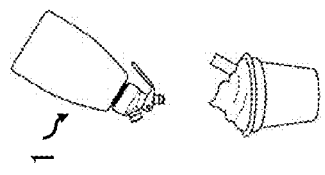
FIGS. 11A to 11D are views for illustrating a conventional whipped cream producing method using an espuma.
Figure 11C:
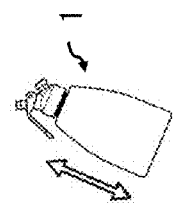
Figure 11B:
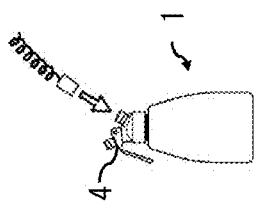
Figure 11A:
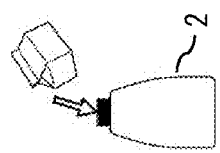

FIG. 9 shows an example of the state in which the discharged whipped cream is not foamed (no foaming) indicating "inappropriate" foamability (FM), and FIG. 10 shows an example of the state in which the discharged whipped cream is foamed enough to become whipped cream indicating "appropriate" foamability (FM).

Here, the load-bearing pressure was calculated from the magnitude of the load when the load was applied on the discharged whipped cream and the cream started to sink and the area of the load.

When the foamability (FM) evaluation and the fluidity (FL) evaluation were both in the "appropriate" ranges (i.e., "o"), it was observed that the whipped cream was made by spraying from the outlet using argon or nitrogen gas.

Specifically, as shown in the experiment result in FIG. 7, using argon gas, when the agitation time was relatively short in the filling pressure range (d), the discharged whipped cream was an insufficiently foamed sample, but when the agitation time was relatively long, the resulting whipped cream foamed sufficiently. It was observed that as the filling pressure increased, the agitation time tended to be shorter to obtain sufficiently foamed whipped cream.

It was also observed that when the agitation time was longer in a relatively high filling pressure range, some samples ended up having a decreased fluidity for the liquid food product in the container. In this case, it should be difficult for the liquid food product to be discharged from the discharge outlet by spraying, and the state was inappropriate for the method for making whipped cream by spraying the liquid food product out from the discharge outlet.

As can be seen from the experiment result in FIG. 8, the agitation time tends to be longer in the case of using nitrogen gas than the case of using argon gas, but even in this case, the result indicates that sufficiently foamed whipped cream can be made. Similarly to the case of using argon gas, it was observed that as the filling pressure increased, the agitation time tended to be shorter to obtain sufficiently foamed whipped cream.

In this way, in the foamed food product producing device according to the present invention, the presence of the configuration for and the processing step of rotating the agitator provided in the container and agitating fresh cream allows fresh cream and gas to be appropriately mixed using argon gas or nitrogen gas and the cream to keep necessary fluidity in the container and foam into whipped cream by expansion of the gas mixed in the fresh cream as the fresh cream is sprayed and discharged from the container.

It should be understood that the present invention is not limited by the embodiment described above, and design changes without departing from the gist and scope of the invention including various modifications and variations which would be conceived by a person having ordinary skill in the art are encompassed by the present invention.

The invention claimed is:

1. A device for producing a foamed food product, comprising:
   a container which stores a liquid food product and is filled with filling gas at a pressure higher than atmospheric pressure, the filling gas containing argon or nitrogen as a main component;
   an agitator provided at the bottom of the inside of the container;
   a driving unit detachably connected to the bottom of the container to rotate the agitator, agitate the liquid food product in the container by the rotation of the agitator, and mix the filling gas in the liquid food product; and
   a dispenser mounted to the container and having a discharge outlet and a gas filling inlet for injecting the filling gas into the container,
   the dispenser causing the liquid food product having the filling gas mixed therein to be discharged from the discharge outlet by pressure in the container, so that the liquid food product foams while being discharged from the discharge outlet and is made into the foamed food product.

2. The device according to claim 1,
   wherein the agitator has a rotating blade.

3. The device according to claim 1,
   wherein the agitator agitates the liquid food product to such a degree that the liquid food product is fluid enough to flow down in the container when the container is turned upside down.

4. The device according to claim 2,
   wherein the agitator agitates the liquid food product to such a degree that the liquid food product is fluid enough to flow down in the container when the container is turned upside down.

5. A method for producing a foamed food product using the device according to claim 1, the method comprising the steps of:
- introducing the liquid food product into the container;
- mounting the dispenser to the container;
- filling the container with the filling gas injected from the gas filling inlet of the dispenser;
- connecting the bottom of the container with the driving unit and rotating the agitator, thereby agitating the liquid food product in the container; and
- causing the liquid food product to be discharged from the discharge outlet of the dispenser and foam while being discharged from the discharge outlet, thereby producing the foamed food product.

6. The method for producing a foamed food product according to claim 5,
wherein the liquid food product is agitated by the rotation of the agitator to such a degree that the liquid food product in the container is fluid enough to flow down in the container when the container is turned upside down.

7. The method according to claim 6,
wherein the agitator has a rotating blade.

* * * * *